United States Patent [19]

Sarges et al.

[11] Patent Number: 4,530,252
[45] Date of Patent: Jul. 23, 1985

[54] LONG PATH LENGTH MECHANISM FOR AUTOMATIC INSERTION AND EJECTION OF AN INFORMATION CARRIER

[75] Inventors: Heidrun Sarges; Klaus Kommoss, both of Wetzlar-Neunheim; Valentin H. Schütte, Wetzlar, all of Fed. Rep. of Germany

[73] Assignee: U.S. Philips Corporation, New York, N.Y.

[21] Appl. No.: 393,942

[22] Filed: Jun. 30, 1982

[30] Foreign Application Priority Data

Jul. 4, 1981 [DE] Fed. Rep. of Germany ....... 3126497

[51] Int. Cl.³ .................. H04N 7/14; F16H 35/00; F16H 21/44; F16H 21/54
[52] U.S. Cl. .................. 74/388 R; 74/437; 74/100 R; 74/97; 74/109; 360/105
[58] Field of Search ............ 360/96.5, 105, 137, 360/96.1; 74/388, 437, 100, 97, 109

[56] References Cited

U.S. PATENT DOCUMENTS

| 277,988 | 5/1883 | Burk | 74/437 |
| 2,754,688 | 7/1956 | Barecki | 74/100 R |
| 2,816,181 | 12/1957 | Mann et al. | 74/100 R |
| 3,572,143 | 3/1971 | Van Riemsdijk | 74/437 |
| 4,071,859 | 1/1978 | Sami | 360/105 |
| 4,295,169 | 10/1981 | Iwata et al. | 360/105 |
| 4,453,425 | 6/1984 | Wayman et al. | 74/100 R |

FOREIGN PATENT DOCUMENTS 2637141 2/1977 Fed. Rep. of Germany .

OTHER PUBLICATIONS

"Types of Non-Circular Gears" *Mechanisms, Linkages, and Mechanical Controls*, ed. Nicholas P. Chironis, copyright 1965.

*Primary Examiner*—Lawrence J. Staab
*Assistant Examiner*—Michael D. Bednarek
*Attorney, Agent, or Firm*—David R. Treacy

[57] ABSTRACT

A device for automatically inserting and ejecting an information carrier by means of an over-center mechanism, which is actuated manually until the over-center point is reached. The over-center mechanism comprises an eccentric gear which has a diameter which increases as the insertion movement proceeds, the gear surface engaging a sliding member for the information carrier. As a result, the automatic insertion path length is increased relative to the manual insertion path length.

10 Claims, 7 Drawing Figures

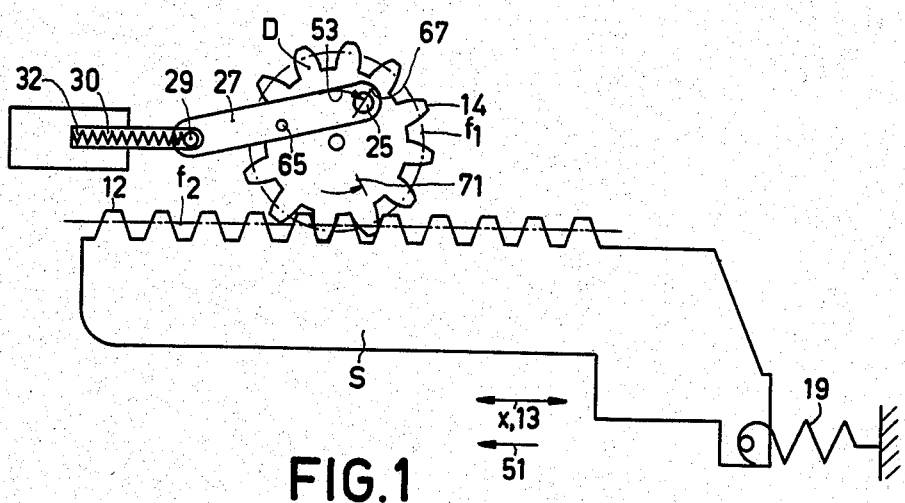
FIG.1
PRIOR ART
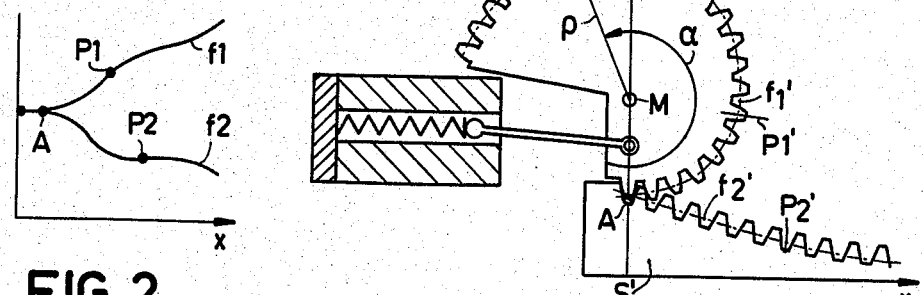
FIG.2
FIG.3
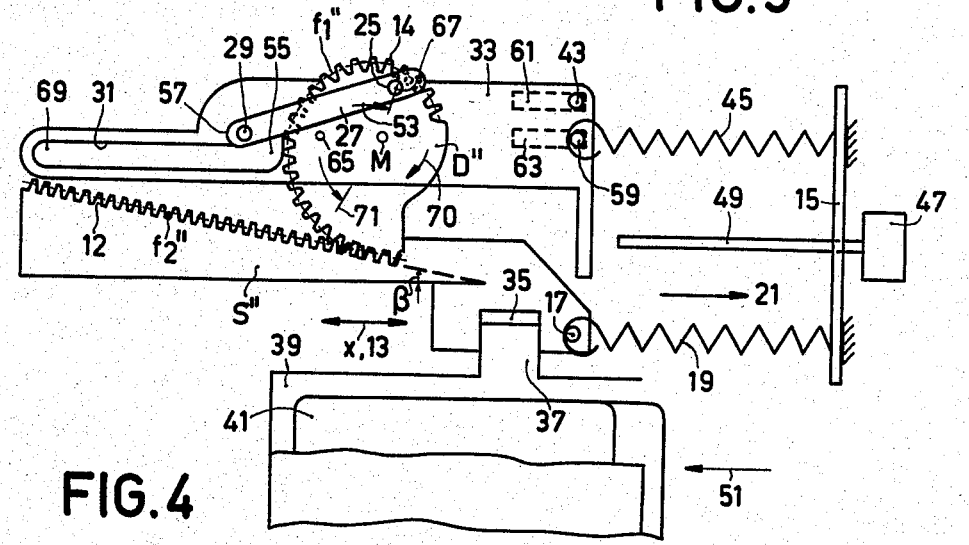
FIG.4

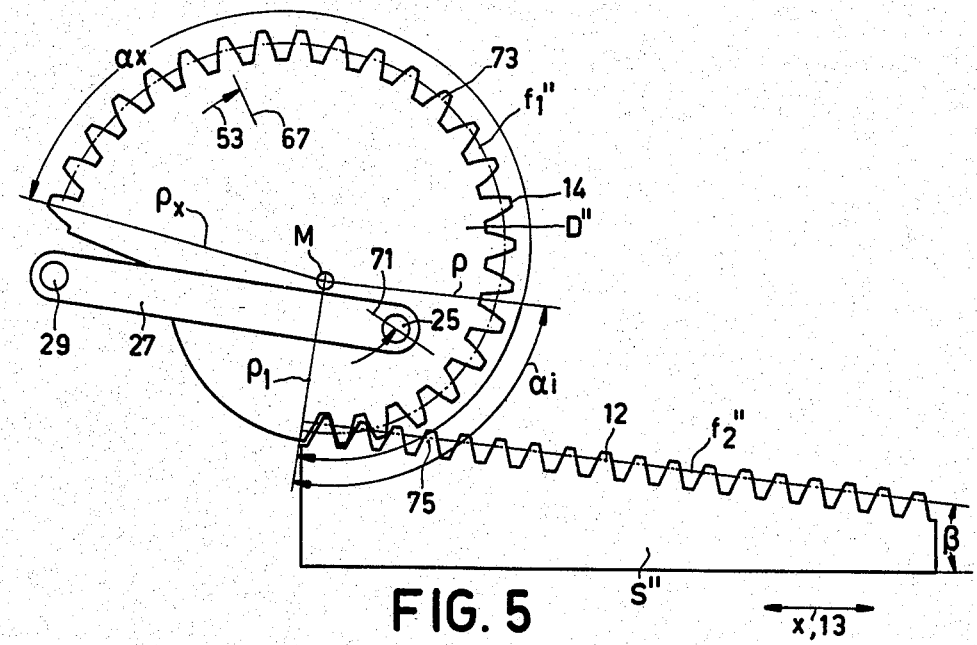
FIG. 5
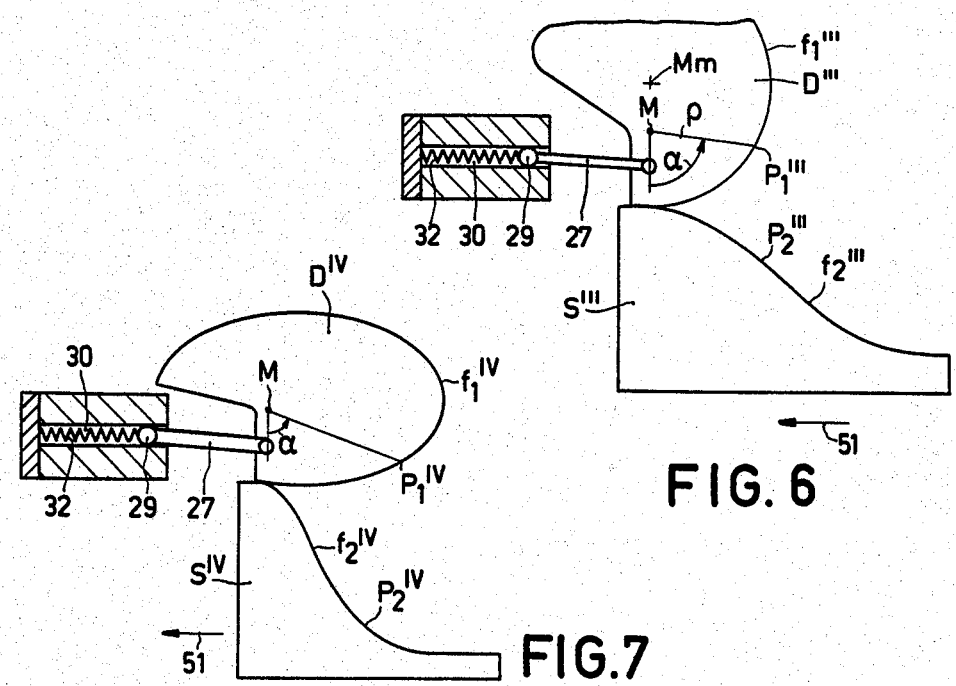
FIG. 6
FIG. 7

LONG PATH LENGTH MECHANISM FOR AUTOMATIC INSERTION AND EJECTION OF AN INFORMATION CARRIER

BACKGROUND OF THE INVENTION

The invention relates to a device for automatic insertion and ejection of an information carrier, and more particularly to such a device comprising a carrying element which cooperates with the information carrier, a slidable drive member which is moved by the carrying element and which stores energy in a return spring during insertion of an information carrier, and an over-center mechanism comprising a rotary drive member such as a rotatable gear member which cooperates with the slidable drive member and which is eccentrically coupled to a connecting rod, the rod having a remote end which is guided longitudinally and, an over-center spring which exerts a biasing force on the connecting rod via a control plate, which force is greater than that of the return spring, the over-center mechanism having a latched position when it is rotated beyond the over-center point.

Such a device is known from German Patent No. 26 37 141, to which U.S. Pat. No. 4,071,859 corresponds. When a tape cassette is inserted into the cassette holder the cassette takes along a gear rack. As a result of this, a return spring connected to the rack is thus storing energy which will later be used to eject the cassette. As the cassette is inserted the rack rotates an over-center mechanism, which comprises a "crank" gear-wheel or pinion functioning as the rotary drive member which is in mesh with the rack, and a connecting rod which is coupled electrically to the pinion. As a result of the manual insertion of the cassette the over-center mechanism is rotated beyond its over-center point and the pretensioned connecting rod automatically rotates the pinion into a latched position upon passage of the over-center point. For this purpose the over-center spring which acts on the connecting rod must be stronger than the return spring of the rack. When the pinion is unlatched the over-center mechanism automatically moves the rack beyond the over-center point into the initial position under the influence of the return spring. As a result of this construction of an automatic insertion mechanism, the room at the front of the apparatus is not sufficient to accommodate further functional elements.

SUMMARY OF THE INVENTION

It is an object of the invention to provide a device of the kind mentioned in the opening paragraph which in general provides an extension of the automatic insertion and ejection path lengths of information carriers, and a reduction of the manual insertion path, in order to obtain more room for other function elements at the front of the apparatus.

According to the invention this object is achieved in that the rotary drive member is a disc with an external drive surface, the distance between the center of rotation and the drive surface increasing in the direction in which the disc rotates during insertion and in that the sliding drive member is a drive rod which is adapted to cooperate with the rotary drive member and which comprises a contact surface which cooperate with the drive surface of the disc.

The drive and contact surfaces may take any arbitrary form, for example the form of friction surfaces. In a preferred embodiment the rotary drive member is a spiral gear and the sliding drive member is a gear rack which is adapted to cooperate with the spiral gear.

This extends the automatic path length, because the travel of the associated sliding drive member increases as the distance between the center and the drive surface increases. At the same time the manual path length is reduced. The spiral gear, which serves as drive member, provides smooth transitions between the manual and automatic motions.

Gear mechanisms comprising gears with non-circular pitch lines in order to obtain a specific motion are known (see the book "Feinmechanische Bauelemente" by Prof. Dr. In. Siegfried Hildebrand, Karl-Hanser-Verlag, Munich 1968). It is known from this book that gear mechanism comprising gears with non-circular pitch lines are rarely used, because their manufacture is expensive and inaccurate. As a result of these inaccuracies, which until now were regarded as annoying, a gear rack which co-operates with a spiral gear, is for example non-linear, but follows an arbitrarily curved path.

Such an over-center mechanism may be constructed in accordance with the following rules:

The teeth of the spiral gear comply with the function $f_1 = \rho(\alpha)$ where $\rho$ is the instantaneous distance between the center of rotation of the spiral gear and the tooth center and $\alpha$ is the angle between the radius to the center of the first tooth and the radius to the center of the tooth being considered; and the teeth or the gear rack should comply with the function $f_2(\rho)$, where $$f_2(\rho(\alpha)) = \int_0^\alpha \rho(x) dx.$$

This relationship between $f_1$ and $f_2$ follows from the requirement that the gear rack ($=f_2$) should perform a rectilinear movement upon rotation of the drive member ($=f_1$).

For each monotonically increasing $\rho(\alpha)$ this requirement unambiguously yields a corresponding function $f_2(\rho)$; conversely, this relationship may also be employed for determining $\rho(\alpha)$ if $f_2(\rho)$ is known.

The rectilinear movement of the gear rack is a prerequisite for technical feasibility.

Such a drive mechanism with a montontically increasing $\rho(\alpha)$ has an increasing transmission ratio. However, in general the design of the spiral gear and gear rack is comparatively intricate.

In a further embodiment of the invention the spiral gear has an exponentially increasing transmission ratio and the teeth $f_2''$ of the spiral gear obey the following laws:

$$\rho(\alpha) = \rho_1 \cdot e^{\frac{\rho_x - \rho_1}{\sqrt{B^2 - (\rho_x - \rho_1)^2}} \cdot \alpha} \qquad 1.$$

$$i = \frac{\sqrt{B^2 - (\rho_x - \rho_1)^2}}{\rho_x - \rho_1} \cdot \ln\left(1 + \frac{\rho_x - \rho_1}{B \cdot \rho_1} \cdot t \cdot i\right) \qquad 2.$$

$$(i = 1, 2, \ldots, x)$$

-continued $$a_x = \frac{\sqrt{B^2 - (\rho_x - \rho_1)^2}}{\rho_x - \rho_1} \cdot \ln\frac{\rho_x}{\rho_1} \qquad 3.$$

Here $\rho$ increases exponentially with the angle of rotation, equidistantly spaced teeth on the gear rack S" being guaranteed.

The function $f_1''$ of the gear rack S" is a straight pitch line which is tangent to the spiral gear D" and which makes an angle $\beta$ with the direction of movement x of the gear rack.

The ratio of the automatic path length $W_A$ and the manual path lengths $W_M$ increases exponentially and is always greater than 1.

In the formulas:

$\rho$ is the distance between each individual tooth center and the center of rotation of the spiral, $\rho_1$ the distance between the tooth center of the first tooth and the center of rotation of the spiral, $\rho_x$ the distance between the center of the last tooth and the center of rotation of the spiral, B the developed length of the spiral gear and gear rack, $$B = n \cdot t = (z-1) \cdot t = (z-1) m \cdot \pi,$$

z the number of teeth, t the pitch $m \cdot \pi$, m the module, n the number of teeth minus 1, $a_x$ the angle between the first and the last tooth, $a_i$ the angle between the first tooth and the tooth being considered, i the running index $$\beta = \arcsin\frac{\rho_x - \rho_1}{B}$$

The rotatable drive member may have shapes other than the spiral shape. Such other shapes are for example an eccentrically journalled disc or an ellipse, only parts of the circumferential surfaces being used of course.

An embodiment of the invention will be described in more detail, by way of example, with reference to the drawing.

BRIEF DESCRIPTION OF THE DRAWING

FIG. 1 is a schematical side view of the known over-center mechanism construction having a 1:1 transmission ratio between the automatic path length and the manual path length (gear wheel and linear gear rack in the direction of movement), FIG. 2 is a graph showing a general gear-construction principle, FIG. 3 is a schematic side view of an embodiment comprising a spiral gear with a linearly increasing transmisssion ratio, that is, $\rho(\alpha) = a\alpha + b$, the ratio of the automatic path length to the manual path length being greater than 1, FIG. 4 is a schematic side view of an embodiment comprising a spiral gear with an exponentially increasing transmission ratio, that is $\rho(\alpha) = e^{a\alpha + b}$; again the ratio of the automatic path length to the manual path length is greater than 1, the gear rack having simple linear teeth.

FIG. 5 is an enlarged view of the spiral gear and the gear rack shown in FIG. 4 in detail, FIG. 6 is a schematic side view showing the principle of an over-center mechanism comprising an eccentrically journalled rotary drive member, FIG. 7 is a schematic side viewing showing the principle of an over-center mechanism comprising an elliptical rotary drive member.

DESCRIPTION OF THE PREFERRED EMBODIMENTS

FIG. 1 schematically represents the operation of an over-center drive mechanism used in a device for the insertion and ejection of a magnetic-tape cassette. However, in general the device may be adapted for use in conjunction with any other information carrier. These include, for example, disc-shaped information carriers, such as floppy discs, video discs, audio discs which are scanned as they rotate, or card-shaped information carriers, such as checks and credit cards which are scanned in a sliding movement, or information carriers in the form of tapes, such as audio cassettes or video cassettes, punched-tape cassettes. The over-center mechanism comprises a sliding drive member, a gear rack S. The rack S has a pitch line, represented as a dash-dot line, which complies with a function $f_2$. In the present case $f_2$ is a straight line. The gear rack S is movable in the direction of a double arrow X, 13, which extends parallel to the straight line $f_2$.

The teeth 14 of a rotary drive member spiral, gear wheel D, mesh with the teeth 12 of the gear rack S. The pitch line of the teeth of the gear wheel D complies with the function $f_1$. The gear wheel D has a crank pin 25 on one of its major surfaces, which pin is coupled to a connecting rod 27. The end of the connecting rod 27 which is remote from the crank pin 25 carries a guide pin 29, which is movable in a slot 30. An over-center spring 32 in the slot tends to urge the connecting rod 27 towards the gear wheel D. If the gear rack S is moved in the direction of the arrow 51 against the action of a return spring 19, the gear wheel D which is in mesh with the gear rack S is rotated in the direction of the arrow 53 from a balanced end position 71 to the over-center point 65. Upon passage of the over-center point 65 the over-center spring 32 urges the connecting rod 27 in the direction of the arrow 53 into a pre-tensioned end position 25. The gear rack S is then moved to the left by the gear wheel D, assuming that the over-center spring 32 is stronger than the return spring 19.

In such a device, which is in principle suitable for the automatic insertion and ejection of, for example, tape cassettes, the ratio during insertion, that is a movement in the direction of the arrow 51, between the manual insertion path length $W_M$ to be covered between the balanced end position 71 and the over-center point 65 and the automatic insertion path length $W_A$ between the over-center point 65 and the pre-tensioned end position 67 is 1:1. In the known over-center mechanism the automatic insertion path length cannot be increased relative to the manual insertion path length.

FIG. 2 schematically represents how the gear rack and the gear wheel co-operate with each other. The function with which the pitch line of the rotary member (the gear wheel D in FIG. 1) complies is designated $f_1$. The function with which the pitch line of the gear rack S complies is designated $f_2$. The lines $f_1$ and $f_2$ are also indicated in FIG. 1. $P_1$ and $P_2$ in FIG. 2 are points which are spaced from each other at the instant represented in FIG. 2, but which become coincident as the rotary drive member rolls further on the sliding drive member. Point A represents the instant at which the pitch lines of the functions $f_1$ and $f_2$ are tangent to each other. As the movement proceeds $P_1$ and $P_2$ will coincide, while the pitch lines to the left of these points are then moved apart.

The transmission ratio between the automatic path length $W_A$ and the manual path length $W_M$ can be greater than 1, if $f_1$ is no longer circular but has a spiral shape. FIG. 3 represents the principle of such an embodiment. The function $f_1'$ then corresponds to a spiral pitch line. The function $f_1'$ may again be written as $f_1 = \rho_{(\alpha)}$, in which $\rho$ is the instantaneous distance between the center of rotation of the spiral and the tooth center and $\alpha$ is the angle between the radius to the center of the first tooth and the radius to the center of the tooth being considered.

For the pitch line of the gear-rack teeth which cooperates with the pitch line in accordance with the function $f_1'$ this yields the function $f_2'$. This function may be represented by the formula:

$$f_2'(\rho_{(\alpha)}) = \int_0^\alpha \rho_{(x)} dx.$$

For $\rho_{(x)} = ax + b$, this yields $$f_2'(\rho) = \frac{\rho^2}{2a} - \frac{b^2}{2a}. \qquad \text{(FIG. 3)}$$

$P_1'$ and $P_2'$ in FIG. 3 are again points which coincide after a specific path length during the rotation of the drive member $D'$ about the center of rotation M and during the movement of the sliding drive member $S'$.

In principle other shapes of the rotary drive member $D'$ and the sliding drive members $S'$ are conceivable. In principle, any monotonically increasing function $\rho(\alpha)$ may be selected, specifically also polynominal $n^{th}$ degrees in $\alpha$. For $f_2'$ this results in corresponding curves of varying complexity.

In general, spiral teeth-functions lead to an extension of the automatic insertion path relative to the manual insertion path.

FIGS. 4 and 5 show an embodiment of the automatic insertion device with over-center mechanism, in which the gear shapes and consequently the pitch lines for the functions $f_1''$ of the rotary drive member $D'$ and $f_2''$ of the sliding drive member $S'$ are simple. Here, it is of special significance that the pitch line of the sliding drive member $D''$, i.e. the connecting rod, is a straight line. The functions of the pitch lines $f_1''$ and $f_2''$ have been explained already in detail in the foregoing. Teeth with such pitch lines $f_1''$ and $f_2''$ provide a ratio between the automatic insertion path $W_A$ and the manual insertion path $W_M$ which increases exponentially from 1.

The over-center mechanism shown in FIG. 4 comprises a gear rack S'', having a pitch line in conformity with the function $f_2''$. This pitch line extends through the centers of the teeth 12 of the gear rack S''. The direction of movement of the gear rack S' is represented by the double arrow x, 13. The ends of a gear-rack tension spring 19 are attached to the chassis 15 of the apparatus and a point of attachment 17 on the gear rack S''. The gear-rack tension spring 19 tends to urge the gear rack S'' in the direction of an arrow 21, i.e. to the right in the drawing.

The teeth 12 of the gear rack S'' are in mesh with the teeth 14 of a spiral gear D'' which is journalled on the chassis and whose pitch line complies with a function $f_1''$. A connecting rod 27 is coupled to a crank pin 25 on a major surface of the gear wheel, which connecting rod has a guide pin 29 whose end which is remote from the crank pin 25 engages an L-shaped slot 31 in a control plate 33. The gear rack S'' and the gear wheel D' together with the connecting rod 27 and the control plate 33 form the over-center mechanism.

The gear rack S'' has a recess 35 engaging a projection 37 of a cassette holder 39.

The control plate 33 is pivotable about a pivot 43, which comprises a pin which is connected to the plate and which is movable in a slot 61 in the chassis. An over-center spring 45, which is attached to the chassis 15 and a spring-attachment means 59 of the control plate 33 pivots the control plate 33 counterclockwise against the gear rack S'' and simultaneously pulls the control plate 33 to the right. By means of a push-button 47 and a push-button rod 49 the control plate 33 can be swung back in the clockwise direction against the pretension of the over-center spring 45.

Automatic insertion is effected as follows. A tape cassette 41 is placed into the cassette holder 39 and together with this holder it is pushed into the apparatus in the direction of an arrow 51. The projection 37 then moves the gear rack S''. The spiral gear D'', which is in mesh with the gear rack S'', revolves in the direction of an arrow 53. The guide pin 29 is positioned against an edge 57 in the short portion 55 of the L-shaped slot. During the rotation of the spiral gear D the control plate 33 is moved against the tension exerted by the over-center spring 45, the pivot 43 and the spring attachment means 59, which engages a slot 63, being slid to the right in the slots 61 and 63 respectively in the chassis 15. These movements store energy in the over-center spring 45; this energy will be used to provide the automatic travel. Upon passage of the over-center point 65 the over-center spring 45 pulls the control plate 33 into a pre-tensioned intermediate end-position 67. The spring attachment means 59 and the pin of the pivot 43 are then positioned against the right-hand ends of the slots 61 and 63, respectively. The insertion path between the over-center point 65 and the intermediate end position 67 is followed automatically because the over-center spring 45 is stronger than the gear-rack spring 19. As a result of the increasing spiral diameter the insertion path length after passage of the over-center point 65 is greater than before this point.

FIG. 4 represents the insertion device in the loaded position, that is upon completion of the automatic insertion. If the tape cassette 41 is to be ejected after being played, depression of the push-button 47 results in pressure being exerted on the control plate 33 via the push-button rod 49, so that the plate is pivoted in the clockwise direction about the pivot 43. As a result of this, the guide pin 29 of the connecting rod 37 moves out of the short portion 55 of the L-shaped slot 31 and slides into its long portion 69. The gear-rack spring 19, in which energy has been stored during both the manual insertion and automatic insertion movements, can now rotate the over-center mechanism back in the direction of an arrow 70, the ejection path between the pretensioned intermediate end-position 67 and the end position 71 via the over-center point 65 being covered automatically as a result of the tension of the gear-rack spring 19.

FIG. 5 represents the spiral gear D" which cooperates with the gear rack S" on an enlarged scale. The gear rack S" and the spiral gear D" are not in the position shown in FIG. 4 but in the initial position for inserting a cassette, that is the crank pin 25 is in the end position 71. The first radius $\rho_1$ of the spiral gear D", which has the smallest length, and the last radius $\rho_x$, which has the greatest length, are also shown. All the radii $\rho$ of increasing length $\rho$ of the intermediate teeth 14 are located between $\rho_1$ and $\rho_x$. The angle $\alpha$ is always measured relative to the radius $\rho_1$. The angle $\alpha_i$ is shown relative to the radius $\rho$ and $\alpha_x$ represents the angle between $\rho_1$ and $\rho_x$. The pitch line, which extends through the tooth centers 73 of the teeth of the spiral gear D" and which interconnects all the tooth centers 73, is designated $f_1''$. In the same way as the centers of the teeth 14 the teeth 12 of the gear rack S" also have centers 75. These centers are interconnected by the straight line $f_2''$.

FIG. 6 shows another embodiment of the invention. The rotary drive member D''' is a circular disc with the center $M_m$. However, the disc D''' is rotatable about the point M. Consequently, as the angle $\alpha$ increases the distance $\rho$ between the point M and the drive surface $f_1'''$ increases. As a result of this, the transmission ratio between the gear rack S''' and the rotary drive member D''' increases during a movement of the gear rack S''' in the direction of the arrow 51. The contact surface $f_2'''$ is not linear.

In a further embodiment shown in FIG. 7 the rotary drive member $D^{IV}$ is an elliptical disc with a drive surface $f_1^{IV}$. The rotary drive member $D^{IV}$ is rotatable about the point M. In the same way as in the embodiment shown in FIGS. 3 and 6 a connecting rod 27 is coupled to the rotary drive member $D^{IV}$, the connecting-rod end which is remote from the rotary drive member being provided with a guide pin 29 which is slidable in a slot 30. An over-center spring 32 in the slot tends to move the connecting rod 27 towards the drive member D. In the same way as in the other embodiments the elliptical drive member $D^{IV}$ co-operates with a drive member $S^{IV}$ having a contact surface $f_2^{IV}$. As the drive member $S^{IV}$ is moved in the direction of the arrow 51 the rotary drive member $D^{IV}$ is moved along. Also in this case the transmission ratio is greater than 1. The over-center mechanism shown in FIGS. 6 and 7 further operate in the same way as the over-center mechanism in the preceding embodiments. The reference signs in the claims are not limiting the interpretation of the claims but are only included with the intention of classification.

What is claimed is:

1. A device for automatic insertion and ejection of an information carrier into and out of a holder, which device comprises
   a carrying element which cooperates with the information carrier,
   a slidable drive member which is moved by the carrying element,
   a return spring connected to the drive member and arranged to be tensioned during insertion of an information carrier,
   an over-center mechanism, comprising a rotary drive member which engages the slidable drive member, and a connecting rod to which the rotary drive member is eccentrically coupled, the end of the rod which is remote from a point where said rod is coupled to the rotary drive member being guided longitudinally, and
   an over-center spring which exerts a biasing force on the connecting rod, which biasing force has a greater effect than that of the return spring, the over-center mechanism thereby having a latched position when it is rotated beyond the over-center point,
   characterized in that the rotary drive member is a disk having an external drive surface, the distance between the drive member center of rotation and the drive surface increasing in the direction in which said disc rotates during insertion, and in that the slidable drive member is a drive rod arranged to cooperate with the rotary drive member, which slidable member comprises a contact surface which engages the drive surface of the disc.

2. A device as claimed in claim 8, characterized in that the rotary drive member is a spiral gear (D) and the slidable drive member is a gear rack (S) which is adapted to cooperates with the spiral gear.

3. A device as claimed in claim 2, characterized in that the locations of the teeth of the spiral gear (D) are defined by a curve represented by an $n^{th}$ degree polynomial in $\alpha$, the sliding drive member (S) being adapted to cooperate therewith.

4. A device as claimed in claim 2 or 3, characterized in that the curve of the spiral drive surface at least substantially complies with the function $f_1' = \rho_{(\alpha)}$ and the adapted curve of the connecting-rod contact-surface with the function $f_2'(\rho_{(\alpha)})$, which is defined by $$f_2'(\rho_{(\alpha)}) = \int_0^\alpha \rho_{(x)} d_x$$

in which
  $\rho$ is the distance between each individual tooth center and the center of rotation of the spiral,
  $\alpha$ is the angle between the radius to the center of the first tooth and the radius to the center of the tooth being considered, and
  $\rho_{(x)}$ is the distance between the center of the last tooth and the center of rotation of the spiral.

5. A device as claimed in claim 2, characterized in that the curve ($f_1''$ of the spiral drive surface obeys the following laws:

1. $$\rho_{(\alpha)} = \rho_1 \cdot e^{\sqrt{\frac{\rho_x - \rho_1}{B^2 - (\rho_x - \rho_1)^2}} \cdot \alpha}$$

2. $$\alpha_i = \frac{\sqrt{B^2 - (\rho_x - \rho_1)^2}}{\rho_x - \rho_1} \ln\left(1 + \frac{\rho_x - \rho_1}{B \cdot \rho_1} \cdot t \cdot i\right)$$

$$(i = 1, 2, \ldots, x)$$

3. $$\alpha_x = \frac{\sqrt{B^2 - (\rho_x - \rho_i)^2}}{\rho_x - \rho_1} \cdot \ln \frac{\rho_x}{\rho_1}$$

and the curve of the drive-rod contact surface (12) is a straight line which makes an angle $$= \arcsin \frac{\rho_x - \rho_1}{B}$$

with the direction of movement of the drive rod, where p is the distance between each individual tooth center and the center of rotation of the spiral, α is the angle between the radius to the center of the first tooth and the radius to the center of the tooth being considered, x is the instantaneously highest numerical value, B is the developed length of the spiral gear and the gear rack, $$B = n \cdot t = (z-1) \cdot t = (z-1) m \cdot \pi,$$

z the number of teeth t is the pitch $m \cdot \pi$, m is the module, n is the number of teeth minus 1.

6. A device as claimed in claim 8, characterized in that the rotary drive member is an eccentrically journalled disc and that the slidable drive member is a drive rod adapted to cooperate with the eccentrically journalled disc.

7. A device as claimed in claim 8, characterized in that the rotary drive member is an ellipse and that the slidable drive member is a drive rod adapted to cooperates with the ellipse.

8. A device for automatic insertion and ejection of an information carrier into and out of a holder, which device comprises:

a chassis within which said holder is mounted, a carrying element which cooperates with an information carrier to be inserted into the holder, means for mounting said element for movement in an insertion direction from an initial position, along a manual insertion path and then along an automatic insertion path, to an inserted position, spring means for storing energy during movement of said element along said manual insertion path, and overcenter means for automatically moving said carrier along said automatic insertion path, using a portion of the energy stored during said movement along the manual insertion path, characterized in that said overcenter means includes:

means for moving said member from the inserted position to the initial position along an ejection path using energy stored during the movement along said manual insertion path, and means, for moving the carrier along a greater distance along said automatic insertion path than along said manual insertion path, comprising:

a rotary-drive member connected to said chassis for rotation about an axis, an overcenter spring, means for coupling said rotary-drive member to said overcenter spring for movement of said member through a given angle to one side of an overcenter position, during movement of said element along said manual insertion path, and movement through an angle equal to said given angle to the other side of said overcenter position during movement of the element along said automatic insertion path, and a positive mechanical coupling between the element and the rotary drive member, arranged such that the element is translated a given distance as the rotary-drive member rotates through said given angle to said one side of the overcenter position, and that the element is translated a distance greater than said given distance as the rotary-drive member rotates through said angle equal to said given angle to the other side of the overcenter position.

9. A device as claimed in claim 8, characterized in that said positive mechanical coupling comprises a spiral gear arranged such that the distances between respective gear teeth and the axis of gear rotation is an increasing function as the gear rotates in a direction corresponding to said insertion direction, and a gear rack connected to said element, extending at an acute angle to the direction of element movement between said initial and inserted positions, arranged to engage said spiral gear.

10. A device as claimed in claim 9, characterized in that said gear rack is a straight rack, and said spiral gear is an exponential spiral selected to mesh with said straight rack.

* * * * *

UNITED STATES PATENT AND TRADEMARK OFFICE
CERTIFICATE OF CORRECTION

PATENT NO. : 4,530,252

DATED : July 23, 1985

INVENTOR(S) : HEIDRUN SARGES ET AL

It is certified that error appears in the above-identified patent and that said Letters Patent is hereby corrected as shown below:

<u>IN THE CLAIMS</u>:

Claim 2, line 1 change "8" to --1--

Claim 6, line 1 change "8" to --1--

Claim 7, line 1 change "8" to --1--

Signed and Sealed this

Fifteenth Day of December, 1987

*Attest:*

DONALD J. QUIGG

*Attesting Officer*     *Commissioner of Patents and Trademarks*